US009819453B2

(12) United States Patent
Sato

(10) Patent No.: US 9,819,453 B2
(45) Date of Patent: Nov. 14, 2017

(54) COMMUNICATION APPARATUS, METHOD OF CONTROLLING COMMUNICATION APPARATUS, AND PROGRAM

(71) Applicant: CANON KABUSHIKI KAISHA, Tokyo (JP)

(72) Inventor: Ryosuke Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 14/334,561

(22) Filed: Jul. 17, 2014

(65) Prior Publication Data
US 2015/0023242 A1 Jan. 22, 2015

(30) Foreign Application Priority Data

Jul. 22, 2013 (JP) ................. 2013-151649

(51) Int. Cl.
H04L 12/18 (2006.01)
H04L 1/18 (2006.01)
(Continued)

(52) U.S. Cl.
CPC ........ *H04L 1/1809* (2013.01); *H04L 12/1877* (2013.01); *H04L 67/1061* (2013.01);
(Continued)

(58) Field of Classification Search
CPC . H04L 67/16; H04L 67/1061; H04L 41/5058; H04L 12/185
See application file for complete search history.

(56) References Cited

U.S. PATENT DOCUMENTS

2005/0108331 A1* 5/2005 Osterman ............... H04L 29/06
709/204
2006/0083236 A1 4/2006 Rachwalski
(Continued)

FOREIGN PATENT DOCUMENTS

CN 101785244 A 7/2010
CN 103152234 A 6/2013
(Continued)

OTHER PUBLICATIONS

UPnP, UPnP Device Architecture 1.1, Oct. 15, 2008, 136 pages.*
(Continued)

*Primary Examiner* — Hoon J Chung
(74) *Attorney, Agent, or Firm* — Canon U.S.A., Inc., IP Division

(57) ABSTRACT

The present invention is directed to a communication apparatus that can notify other communication apparatuses that do not receive a multicast signal, of information on a function provided by the communication apparatus when the communication apparatus sends the multicast signal to notify the information on the function provided by the communication apparatus. The communication apparatus according to an embodiment of the present invention sends a unicast packet containing the information about the function together with the multicast packet to another communication apparatus which does not receive the multicast packet, but does not send the unicast packet together with the multicast packet to another communication apparatus determined as receiving the multicast packet.

8 Claims, 16 Drawing Sheets

(51) Int. Cl.
*H04L 29/08* (2006.01)
*H04W 48/16* (2009.01)
*H04W 80/02* (2009.01)
*H04W 84/12* (2009.01)

(52) U.S. Cl.
CPC ............ *H04L 67/16* (2013.01); *H04W 48/16* (2013.01); *H04W 80/02* (2013.01); *H04W 84/12* (2013.01)

(56) References Cited

U.S. PATENT DOCUMENTS

| | | | |
|---|---|---|---|
| 2008/0008114 A1* | 1/2008 | Kaarela | H04M 1/72527 370/328 |
| 2008/0310444 A1 | 12/2008 | Dekel | |
| 2011/0295962 A1* | 12/2011 | Yasuma | G06F 9/5055 709/206 |
| 2013/0182581 A1 | 7/2013 | Yeung | |

FOREIGN PATENT DOCUMENTS

| | | |
|---|---|---|
| EP | 1753166 A2 | 2/2007 |
| JP | 2006203344 A | 8/2006 |
| JP | 2013-123126 A | 6/2013 |

OTHER PUBLICATIONS

Steeg et al., RFC 6285: Unicast-Based Rapid Acquisition of Multicast RTP Sessions, Jun. 2011, 56 pages.*

Alan Presser et al.; "UPnPTM Device Architecture 1.1;" UPnP Forum; Oct. 15, 2008; pp. 1-136.

B. Ver Steeg, A. Begen, T. Van Caenegem, Z. Vax; "RFC 6285: Unicast-Based Rapid Acquisition of Multicast RTP Sessions;" Internet Engineering Task Force, ISSN: 2070-1721; Jun. 2011; pp. 1-56.

* cited by examiner

FIG.6

601 SERVICE USING APPARATUS MANAGEMENT TABLE

| No | IP ADDRESS | SOURCE PORT NUMBER |
|---|---|---|
| 1 | xxx.xxx.x.xxx | aaa |
| 2 | yyy.yyy.y.yyy | bbb |

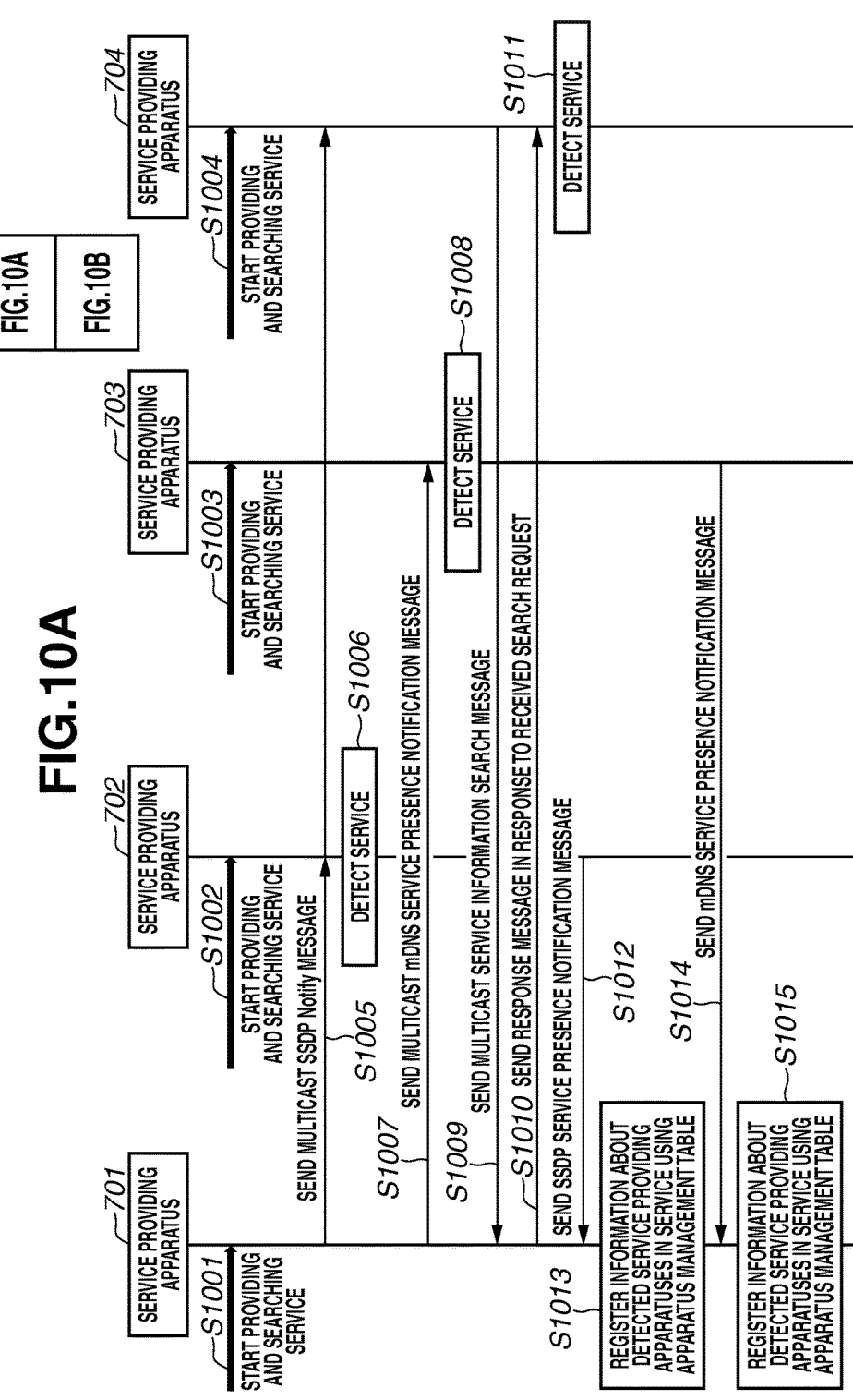

FIG.11

1101 SERVICE USING APPARATUS MANAGEMENT TABLE

| No | IP ADDRESS | SOURCE PORT NUMBER | PROTOCOL TYPE |
|---|---|---|---|
| 1 | xxx.xxx.x.xxx | aaa | SSDP |
| 2 | yyy.yyy.y.yyy | bbb | mDNS |
| 3 | zzz.zzz.z.z.zzz | ccc | SSDP |

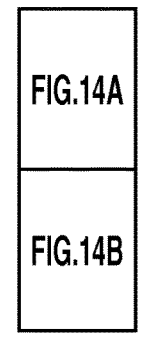
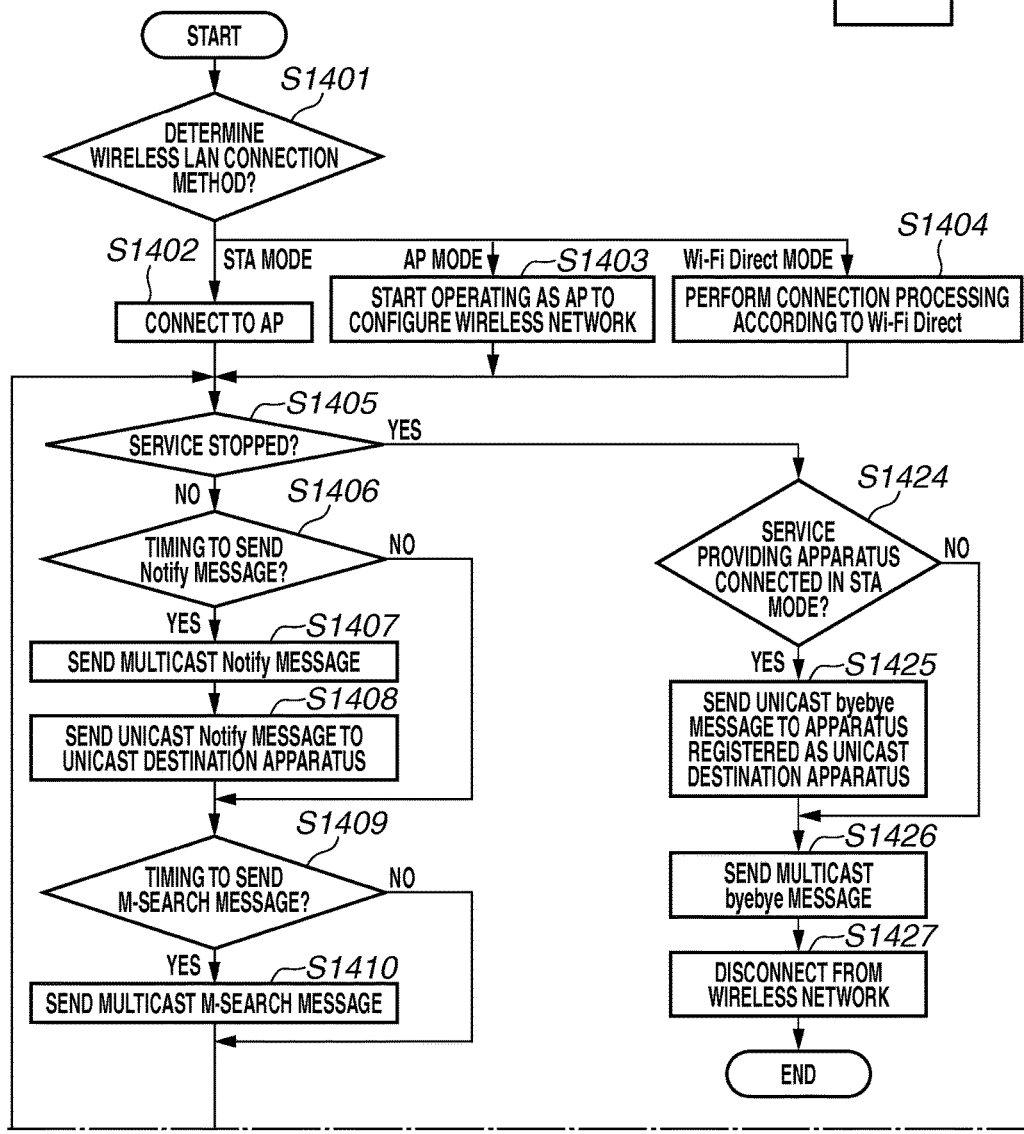
FIG.14

COMMUNICATION APPARATUS, METHOD OF CONTROLLING COMMUNICATION APPARATUS, AND PROGRAM

BACKGROUND OF THE INVENTION

Field of the Invention

The present invention relates to a communication apparatus configured to send information about a function provided by the communication apparatus.

Description of the Related Art

There are communication protocols (hereinafter "service detection protocols") for a communication apparatus to search for a function provided by other communication apparatuses and notify other communication apparatuses of information about a function provided by the communication apparatus via a network. According to the service detection protocols, a communication apparatus sends information about a function provided by the communication apparatus in a multicast signal, thereby notifying an unspecified number of service using apparatuses present in the network about the function provided by the providing apparatus and a change (termination, etc.) in the function.

Meanwhile, there is a communication apparatus that does not receive the multicast signal. Japanese Patent Application Laid-Open No. 2006-203344 discusses a communication apparatus configured to discard multicast signals. Japanese Patent Application Laid-Open No. 2006-203344 discusses a method in which an apparatus that uses a function provided by a providing apparatus sends a unicast signal to an apparatus that provides the function to inquire about the function provided by the communication apparatus, and the using apparatus receives a response to the inquiry to detect the function provided by the providing apparatus.

However, when the function using apparatus inquires of the providing apparatus about the function provided by the providing apparatus, if the function provided by the providing apparatus has been changed, there is a time lag from when the change has been made until the function using apparatus detects the change in the function.

In view of immediacy, the function using apparatus desirably detects the change when notified from the function providing apparatus about the change in the function.

SUMMARY OF THE INVENTION

The present invention is directed to enabling a communication apparatus to notify other communication apparatuses that do not receive a multicast signal of information about a function provided by the communication apparatus when the communication apparatus sends a multicast signal to notify the information about the function provided by the communication apparatus.

According to an aspect of the present invention, a communication apparatus determines whether another communication apparatus receives a multicast packet containing information about a function provided by the communication apparatus, and when the communication apparatus sends the multicast packet, the communication apparatus sends a unicast packet containing the information about the function together with the multicast packet to another communication apparatus determined as not receiving the multicast packet but does not send the unicast packet together with the multicast packet to another communication apparatus determined as receiving the multicast packet.

Further features of the present invention will become apparent from the following description of exemplary embodiments with reference to the attached drawings.

BRIEF DESCRIPTION OF THE DRAWINGS

FIG. 6 illustrates a function using apparatus management table according to the first exemplary embodiment.

FIG. 11 illustrates a function using apparatus management table according to the second exemplary embodiment.

DESCRIPTION OF THE EMBODIMENTS

Various embodiments, features, and aspects of the invention will be described in detail below with reference to the drawings.

Figure 1:
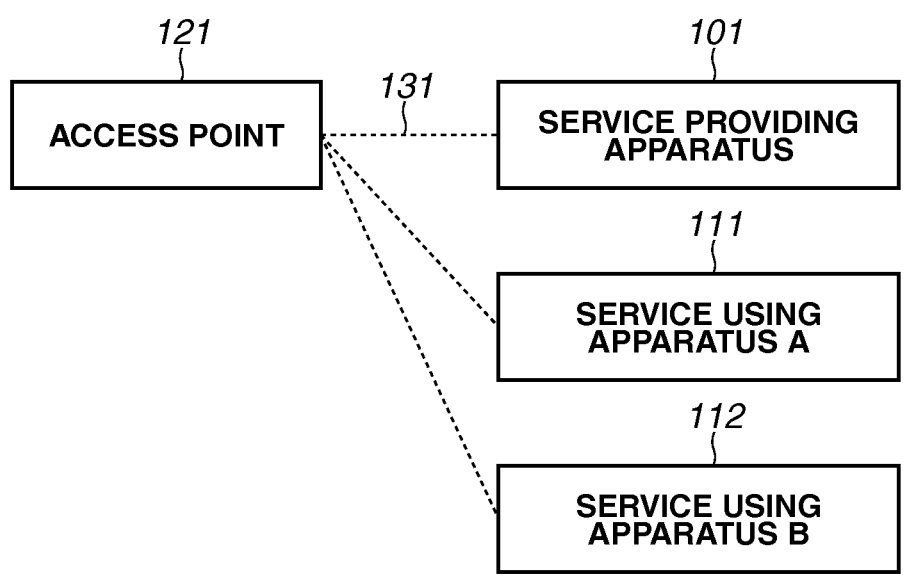
FIG. 1 illustrates the configuration of a system according to a first exemplary embodiment.

FIG. 1 illustrates the configuration of a system according to the first embodiment. In the system, one communication apparatus (hereinafter "providing apparatus") 101, which provides a service, and two other communication apparatuses (hereinafter "using apparatuses") 111 and 112, which use the service provided by the providing apparatus 101, are connected together via an access point (hereinafter "AP") 121. The AP 121 manages a wireless local area network (LAN) 131 compliant with the IEEE 802.11 family. As used herein, the term "service" refers to a function that the providing apparatus provides to the using apparatuses. Examples include an image publication service for providing image data stored in a storage unit 201 to the using apparatuses.

Each of the apparatuses communicates via the wireless LAN 131 compliant with the IEEE 802.11 family. In place of the IEEE 802.11 family, the apparatuses can communicate via a wired LAN such as Ethernet (registered trademark) or a wireless network compliant with any other communication standard such as Bluetooth (registered trademark) and long-term evolution (LTE). "IEEE" is an abbreviation of the Institute of Electrical and Electronics Engineers.

The using apparatus 112 is set not to receive a multicast packet sent from the providing apparatus 101. As used herein, the term "multicast packet" refers to a packet that is sent to a plurality of destination devices. Further, each apparatus is set to receive a unicast packet. As used herein, the term "unicast packet" refers to a packet that is sent to a single destination device.

While the present embodiment assumes the providing apparatus 101 to be a digital camera, the providing apparatus 101 is not limited to the digital camera and can be any other device such as a printer, storage medium, personal computer, and mobile phone. While the present embodiment assumes the using apparatuses 111 and 112 to be mobile phones, the using apparatuses 111 and 112 can be any other devices such as a digital camera, printer, storage medium, and personal computer.

Figure 2:
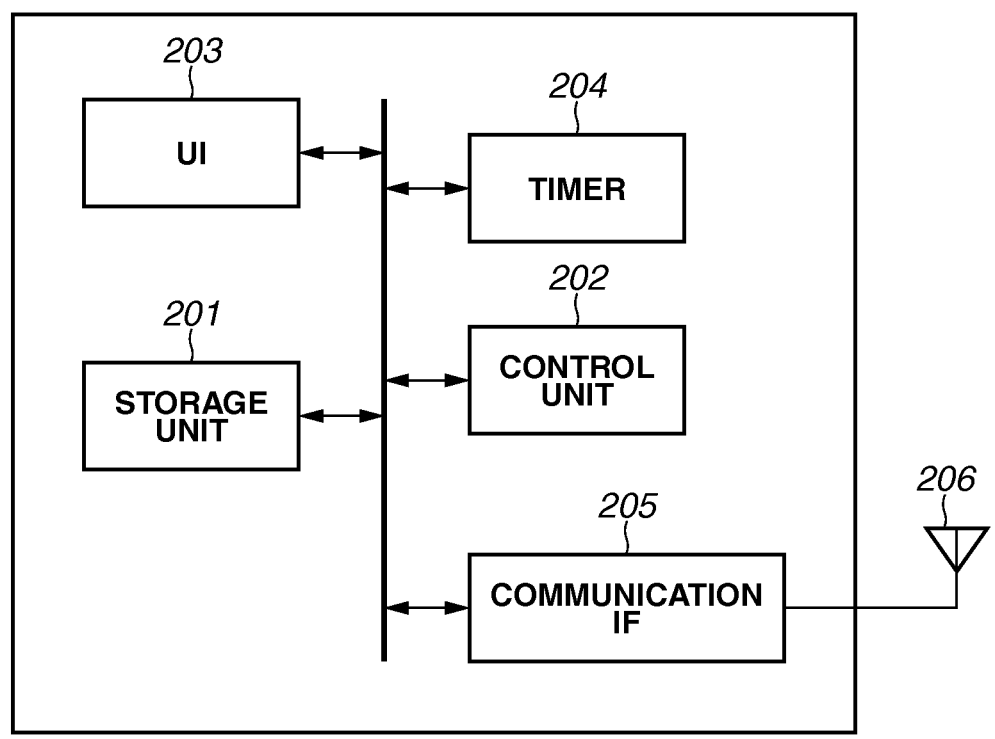
FIG. 2 illustrates the hardware configuration of a providing apparatus.

FIG. 2 illustrates the hardware configuration of the providing apparatus 101. Since the hardware configurations of the using apparatuses 111 and 112 are similar to that of the providing apparatus 101, description of the hardware configurations of the using apparatuses 111 and 112 is omitted in the present embodiment.

The storage unit 201 includes a read-only memory (ROM) and random-access memory (RAM) and stores programs for executing various operations that will be described below and various types of data such as wireless communication network information, data transmission and reception information, and communication apparatus information. In place of a memory such as ROM and RAM, other storage media can be used as the storage unit 201 such as a flexible disk, hard disk, optical disk, magneto-optical disk, compact disk (CD) ROM, CD recordable (CD-R), magnetic tape, non-volatile memory card, and DVD.

A control unit 202 includes a central processing unit (CPU) or micro processing unit (MPU) and is configured to execute a program stored in the storage unit 201 to control the entire providing apparatus 101. The control unit 202 can control the entire providing apparatus 101 by cooperating with an operating system (OS) executed by the control unit 202.

A user interface unit (hereinafter "UI") 203 outputs various types of information and receives various user operations. The output includes at least one of a display on a screen, audio output from a speaker, and vibration output. A timer 204 measures a predetermined time period by counting down, counting up, or measuring the time. A communication interface unit (hereinafter "communication IF") 205 performs communication compliant with the IEEE 802.11 family by use of an antenna 206.

Figure 3:
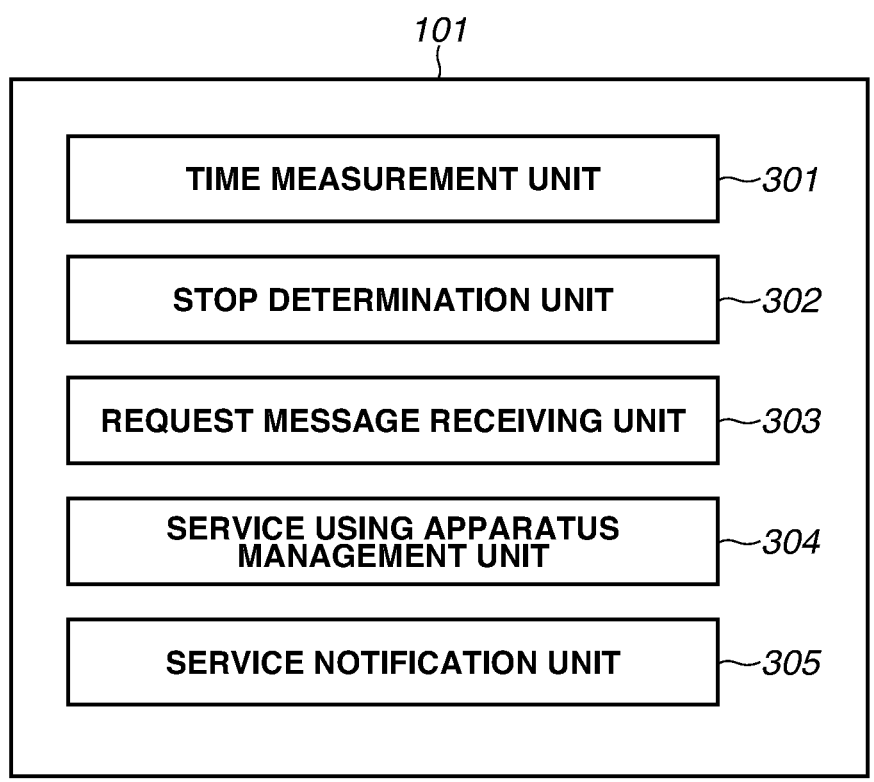
FIG. 3 is a function block diagram realized by the providing apparatus.

FIG. 3 illustrates the function block diagram of the providing apparatus 101. According to the present embodiment, the control unit 202 reads and executes a program stored in the storage unit 201 to realize the function blocks of the providing apparatus 101. A part or all of the function blocks of the providing apparatus 101 can be realized by hardware devices.

To realize a function block by the hardware devices, for example, a predetermined compiler is used to automatically generate a dedicated circuit on a field programmable gate array (FPGA) from a program for realizing the function block, and the dedicated circuit can be used as hardware having the function of the function block. A gate array circuit can be formed similar to the FPGA to realize the function block by hardware devices.

A time measurement unit 301 measures a predetermined time period by use of the timer 204. A stop determination unit 302 determines whether the provision of service is stopped. Specifically, if a user performs a predetermined operation via the UI 203 such as application of power of the providing apparatus 101, the stop determination unit 302 determines that the provision of service is to be stopped. The stop determination is not limited to the above example. The stop determination unit 302 can determine that the provision of service is stopped if a predetermined time period has expired or if a predetermined message is received from another communication apparatus.

A request message receiving unit 303 receives from the using apparatus 111 or 112 via the communication IF 205 a search signal (hereinafter "service information search message") for searching service information provided by the providing apparatus 101. The request message receiving unit 303 also determines whether a service information search message has been received.

According to the present embodiment, the service information search message is an M-SEARCH message defined by the Simple Service Discovery Protocol (SSDP) and a search packet for searching for service information provided by another providing apparatus. The SSDP is a communication protocol (hereinafter "service detection protocol") for searching for a service provided by another communication apparatus or notifying another communication apparatus of a service it provides. In place of or in addition to SSDP, a multicast domain name system (mDNS) protocol can be used.

A using apparatus management unit 304 determines a source apparatus that sends a service information search message as a using apparatus. Further, the using apparatus management unit 304 registers in a using apparatus management table 601 (FIG. 6) information about the apparatus determined as a using apparatus and stores the information in the storage unit 201. The using apparatus management table 601 stores an Internet Protocol (IP) address and a source port number of the source apparatus of the service information search message such that the IP address and the source port number are associated with each other.

A service notification unit 305 sends a response signal (hereinafter "response message") via the communication IF 205 in response to the service information search message received by the request message receiving unit 303. The response message contains information about the service provided by the providing apparatus 101. According to the present embodiment, the response message is a Response message defined by SSDP.

The service notification unit 305 also sends a service presence notification message by unicast addressing to the using apparatus registered in the using apparatus management table 601. The service presence notification message contains the information about the service provided by the providing apparatus 101. According to the present embodiment, the service presence notification message is a Notify message defined by SSDP. The service notification unit 305 also sends (multicasts) the service presence notification message to multicast addresses designated by SSDP.

The service notification unit 305 also sends a service withdrawal notification message by unicast addressing to the using apparatus registered in the using apparatus management table 601. The service withdrawal notification message notifies the using apparatus that the providing apparatus 101 stops providing the service. The service withdrawal notification contains information about the function of the service that the providing apparatus 101 stops providing. Accordingly, if the providing apparatus 101 leaves the network, the service withdrawal notification contains information about the function provided by the providing apparatus 101. According to the present embodiment, the service withdrawal notification message is a byebye message defined by SSDP. Further, the service notification unit 305 also sends (multicasts) the service withdrawal notification message to multicast addresses designated by SSDP.

The service notification unit 305 can be configured to send each of the above messages continuously for a plurality of times.

Figure 4:
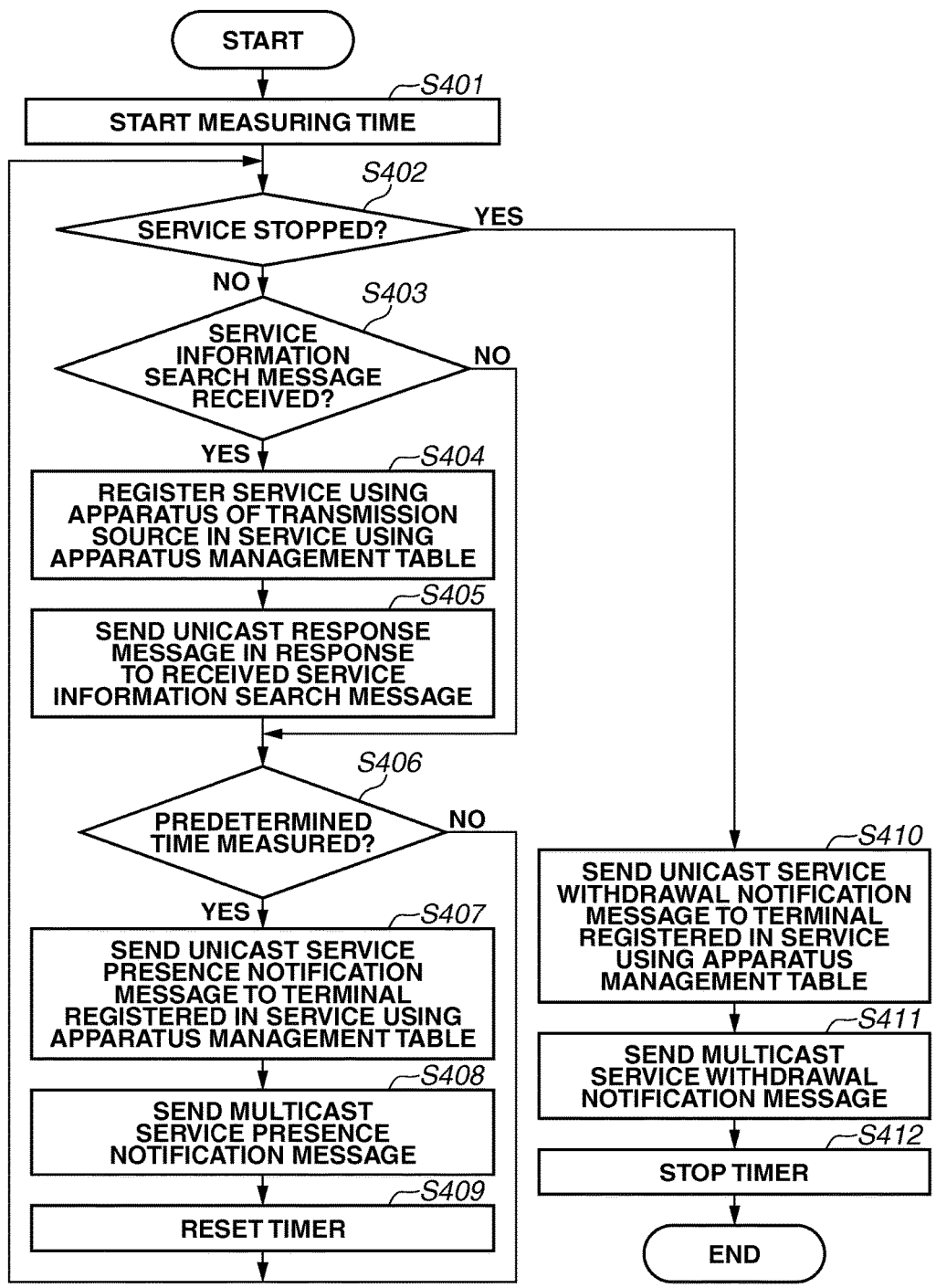
FIG. 4 is a flow chart realized by the providing apparatus.

FIG. 4 illustrates a flow chart realized by the control unit 202 of the providing apparatus 101. The control unit 202 realizes the flow chart by reading a program stored in the storage unit 201. The flow chart is realized if the providing apparatus 101 starts providing a service. The provision of the service is started if a user performs a predetermined operation such as power-on of the providing apparatus 101, a predetermined time period has expired, or a predetermined message is received from an external device such as the using apparatus 111 or 112, etc.

Figure 5:
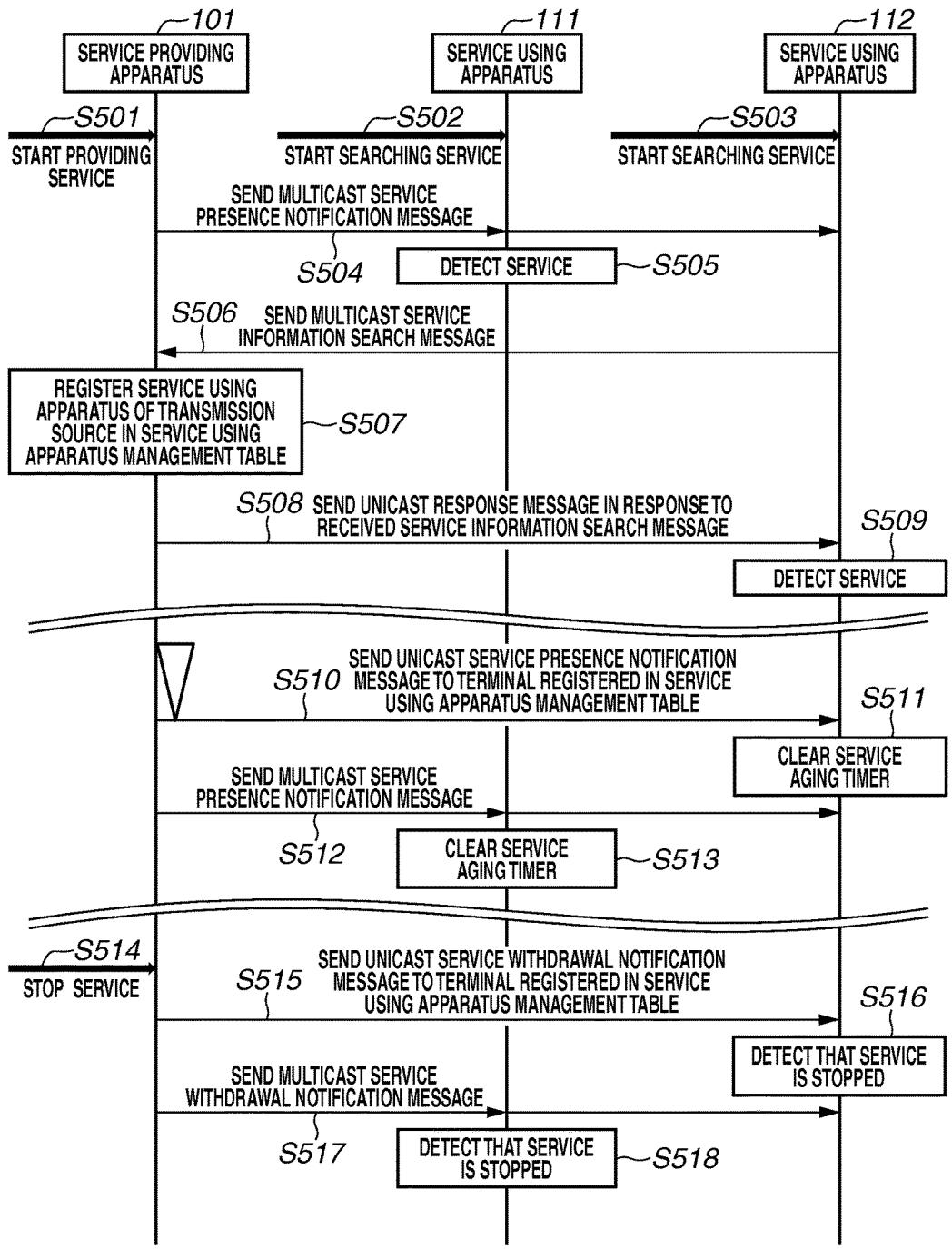
FIG. 5 is a sequence chart according to the first exemplary embodiment.

FIG. 5 illustrates a sequence chart of the case in which the providing apparatus 101 provides a service and the using apparatuses 111 and 112 use the service.

In the present embodiment, the providing apparatus 101 and the using apparatuses 111 and 112 have already joined the wireless LAN 131 configured by the AP 121. Further, the using apparatus 111 is set to receive a multicast message sent from the providing apparatus 101, whereas the using apparatus 112 is set not to receive a multicast message sent from the providing apparatus 101.

In the present embodiment, the using apparatus 112 is set not to receive a multicast message sent by the TCP/IP or UDP/IP function. "TCP" is an abbreviation of "Transmission Control Protocol." "IP" is an abbreviation of "Internet Protocol." "UDP" is an abbreviation of "User Datagram Protocol."

In step S501, a user operates the providing apparatus 101 to start providing a service. In steps S502 and S503, users operate the using apparatuses 111 and 112 to start searching for a service.

In step S401, if the providing apparatus 101 starts providing the service, the time measurement unit 301 starts measuring the time. In step S402, the stop determination unit 302 determines whether the provision of the service is stopped. Until the providing apparatus 101 stops the provision of the service (until YES in step S402), the providing apparatus 101 repeats management of the using apparatuses (steps S403 to S405) and notification of the service information (steps S406 to S409).

If the provision of the service is not stopped (NO in step S402), then in step S403, the request message receiving unit 303 determines whether the request message receiving unit 303 has received a service information search message from the using apparatus 111 or 112.

The following describes the case in which the request message receiving unit 303 has received no service information search message (NO in step S403). If the request message receiving unit 303 has received no service information search message (NO in step S403), then in step S406, the time measurement unit 301 determines whether a predetermined time period is measured. In the present embodiment, the predetermined time period is measured.

If the predetermined time is measured (YES in step S406), then in step S407, the service notification unit 305 sends a service presence notification message by unicast addressing to the using apparatus registered in the using apparatus management table 601. If, however, no using apparatus is registered in the using apparatus management table 601, the service notification unit 305 sends no unicast service presence notification message.

At this stage, no using apparatus is registered in the using apparatus management table 601. Accordingly, in steps S408 and S504, the service notification unit 305 sends no unicast service presence notification message but sends a multicast service presence notification message. In step S409, if the service notification unit 305 sends the multicast service presence notification message, the time measurement unit 301 resets the timer and starts measuring the time again.

In Step S505, the using apparatus 111 having received the multicast service presence notification message detects that the providing apparatus 101 provides the service. On the other hand, the using apparatus 112 does not detect that the providing apparatus 101 provides the service, because the using apparatus 112 does not receive the multicast service presence notification message.

In step S506, the using apparatus 112 multicasts a service information search message at predetermined timing. If the request message receiving unit 303 receives the service information search message and determines that the request message receiving unit 303 receives the service information search message (YES in step S403), then in steps S404 and S507, the using apparatus management unit 304 registers information about the source apparatus having sent the service information search message in the using apparatus management table 601 and stores the information in the storage unit 201. In the present embodiment, the using apparatus management unit 304 registers an IP address and a source port number of the using apparatus 112 in the using apparatus management table 601 such that the IP address and the source port number are associated with each other.

In steps S405 and S508, the service notification unit 305 sends a response message by unicast addressing to the using apparatus 112 in response to the received service information search message. In step S509, the using apparatus 112 having received the service information search response message detects that the providing apparatus 101 provides the service.

In step S406, the time measurement unit 301 determines again whether the predetermined time is measured. If the predetermined time is measured (YES in step S406), then in steps S407 and S510, the service notification unit 305 sends a service presence notification message by unicast addressing to the using apparatus registered in the using apparatus management table 601.

In step S511, the using apparatus 112 having received the unicast service presence notification message detects that the providing apparatus 101 continues the provision of the service, and the using apparatus 112 clears an aging timer which is internally managed. As used herein, the term "aging timer" refers to a timer used to determine whether the providing apparatus 101 continues providing the service.

In steps S408 and S512, the service notification unit 305 sends a service presence notification message by multicast addressing. In step S513, the using apparatus 111 having received the multicast service presence notification message also detects that the providing apparatus 101 continues the provision of the service, and the using apparatus 111 clears the aging timer which is internally managed. Thereafter, the time measurement unit 301 resets the timer and starts measuring the time again. As the foregoing describes, the service notification unit 305 sends a service presence notification message by unicast addressing and multicast addressing in a predetermined cycle.

The following describes the case in which the user operates the providing apparatus 101 thereafter to stop the provision of the service (YES in step S402, step S514). If the user carries out a stop operation (YES in step S402), then in steps S410 and S515, the service notification unit 305 sends a service withdrawal notification message by unicast addressing to the using apparatus registered in the using apparatus management table 601. In step S516, the using apparatus 112 having received the unicast service withdrawal notification message detects that the providing apparatus 101 stops the provision of the service.

In steps S411 and S517, the service notification unit 305 sends a service withdrawal notification message to multicast addresses designated by SSDP. In step S518, the using apparatus 111 having received the multicast service withdrawal notification message also detects that the providing apparatus 101 stops the provision of the service. Then, in step S412, the time measurement unit 301 stops the timer.

According to the present embodiment, a using apparatus (the using apparatus 112 in the above example) that does not receive a multicast packet can also be notified of the service state of a providing apparatus. Furthermore, a using apparatus (the using apparatus 111 in the above example) that does not send a service information search message to a providing apparatus can also be notified of the service state of the providing apparatus.

In the foregoing embodiment, the information about the using apparatus is stored in the using apparatus management table in response to the reception of the service information search message from the using apparatus. However, an embodiment is not limited thereto. The information about the using apparatus can be stored in the using apparatus management table in response to a user operation, or an IP address stored in an Address Resolution Protocol (ARP) table can be stored as the information of the using apparatus. The ARP table is a correspondence table for use in IP communication that lists IP addresses and corresponding media access control (MAC) addresses of devices.

Further, if the providing apparatus has a dynamic host configuration protocol (DHCP) server function, an address assigned to the DHCP server can be stored as the information of the using apparatus.

Further, information of a using apparatus outside the broadcast domain can be stored. By this way, various unicast messages can be sent to a using apparatus that does not send a service information search message, whereby the using apparatus can be notified of the service state of the providing apparatus 101.

Further, only the information about an apparatus that does not send a Membership Query message defined by the Internet Group Management Protocol (IGMP) can be stored in the using apparatus management table. The term "Membership Query message" refers to a message that enables a multicast message to be received by unicast addressing. Specifically, the AP having received a Membership Query message sends various multicast messages sent by unicast addressing to an apparatus that has sent the Membership Query message.

In other words, a multicast message sent from the providing apparatus is resent by the AP by unicast addressing to the apparatus that has sent the Membership Query message. Thus, the providing apparatus does not have to send the message by unicast addressing to the apparatus. Since the providing apparatus does not send a unicast message to the apparatus, the communication band being used can be prevented from increasing.

The second embodiment will describe the case in which apparatuses each having a function both as a providing apparatus and as a using apparatus monitor the service states of one another by use of a plurality of service detection protocols. In the following description, elements that are similar to those in the first embodiment are given the same reference numerals, and description of the elements is omitted.

Figure 7:
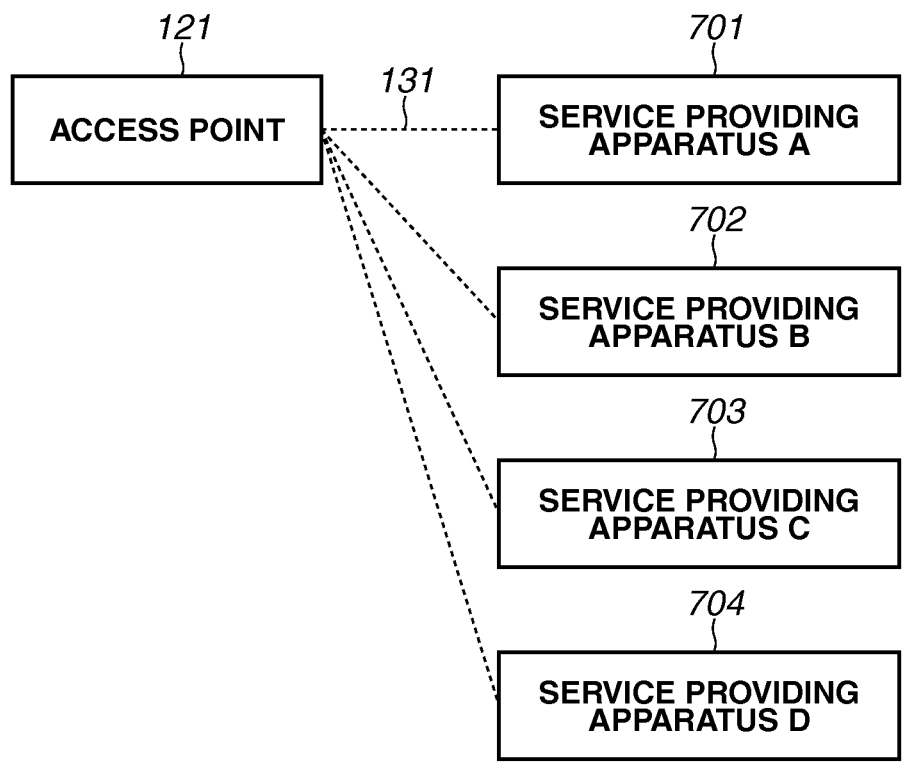
FIG. 7 illustrates the configuration of a system according to a second exemplary embodiment.

FIG. 7 illustrates the configuration of a system according to the present embodiment. In the system, four communication apparatuses (hereinafter "providing apparatuses") 701 to 704, each of which provides and uses a service, are connected to one another via the AP 121.

The providing apparatus 701 is compatible with both the service detection protocols SSDP and mDNS. The providing apparatuses 702 and 704 are compatible with SSDP but incompatible with mDNS. The providing apparatus 703 is compatible with mDNS but incompatible with SSDP.

The hardware configurations of the providing apparatuses 701 to 704 are similar to that of the providing apparatus 101 according to the first embodiment, so description of the hardware configurations is omitted in the present embodiment.

Figure 8:
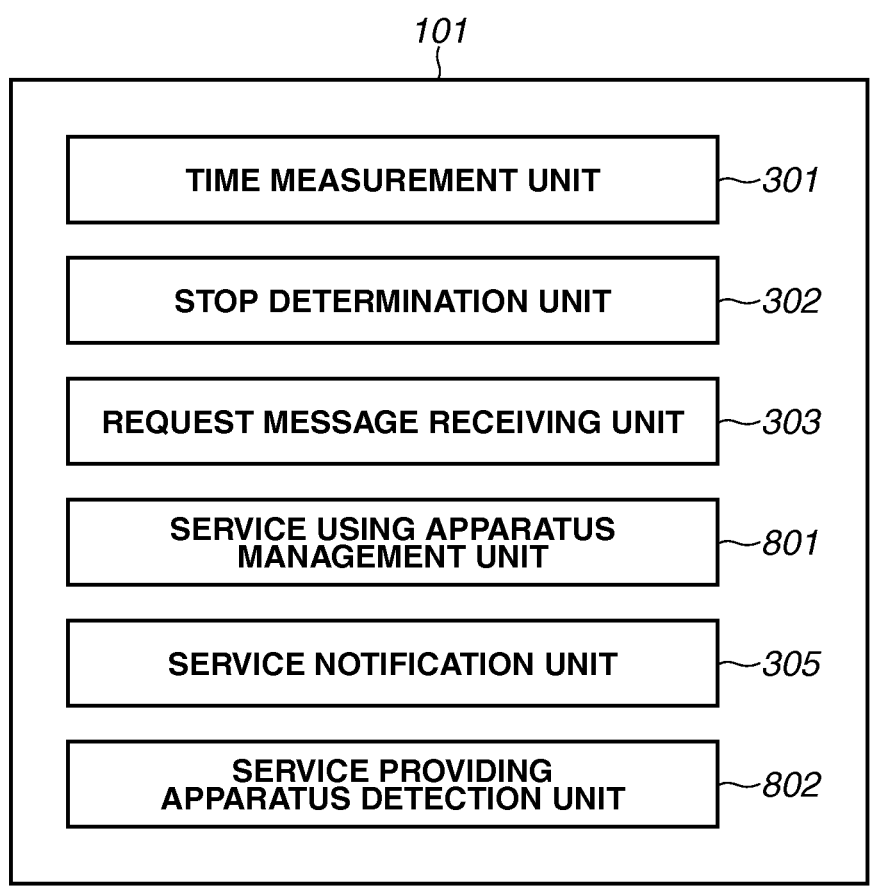
FIG. 8 is a function block diagram realized by a providing apparatus.

FIG. 8 illustrates the function block diagram of the providing apparatus 701. According to the present embodiment, the control unit 202 reads and executes a program stored in the storage unit 201 to realize the function blocks of the providing apparatus 701. A part or all of the function blocks of the providing apparatus 701 can be realized by hardware devices. The function blocks that are similar to those in the first embodiment are given the same reference numerals, and description of the function blocks is omitted in the present embodiment. Further, the function blocks of the providing apparatuses 702 to 704 are also similar to those in the first embodiment, so description of the function blocks is also omitted in the present embodiment.

A using apparatus management unit 801 registers in a using apparatus management table 1101 (FIG. 11) information about an apparatus determined as a using apparatus, and stores the information in the storage unit 201. The using apparatus management table 1101 stores an IP address and a source port number of the using apparatus and corresponding protocol type such that the IP address, the source port number, and the corresponding protocol type are associated with one another.

A providing apparatus detection unit 802 detects another providing apparatus based on a message received from another providing apparatus. Specifically, if the providing apparatus detection unit 802 receives a service presence notification message, the providing apparatus detection unit 802 detects the source apparatus that has sent the service presence notification message as another providing apparatus.

Figure 9:
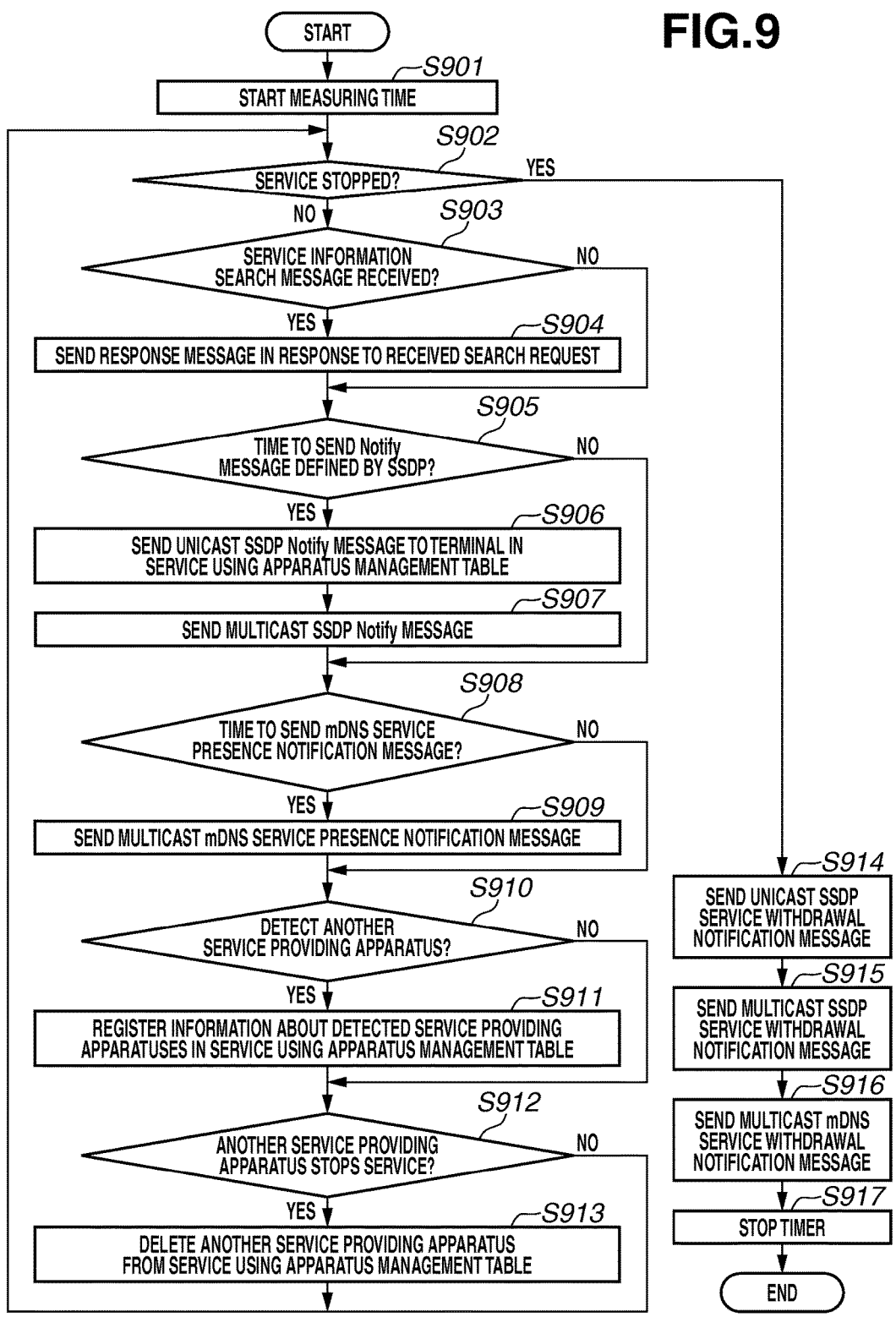
FIG. 9 is a flow chart realized by the function providing apparatus.
Figure 10B:
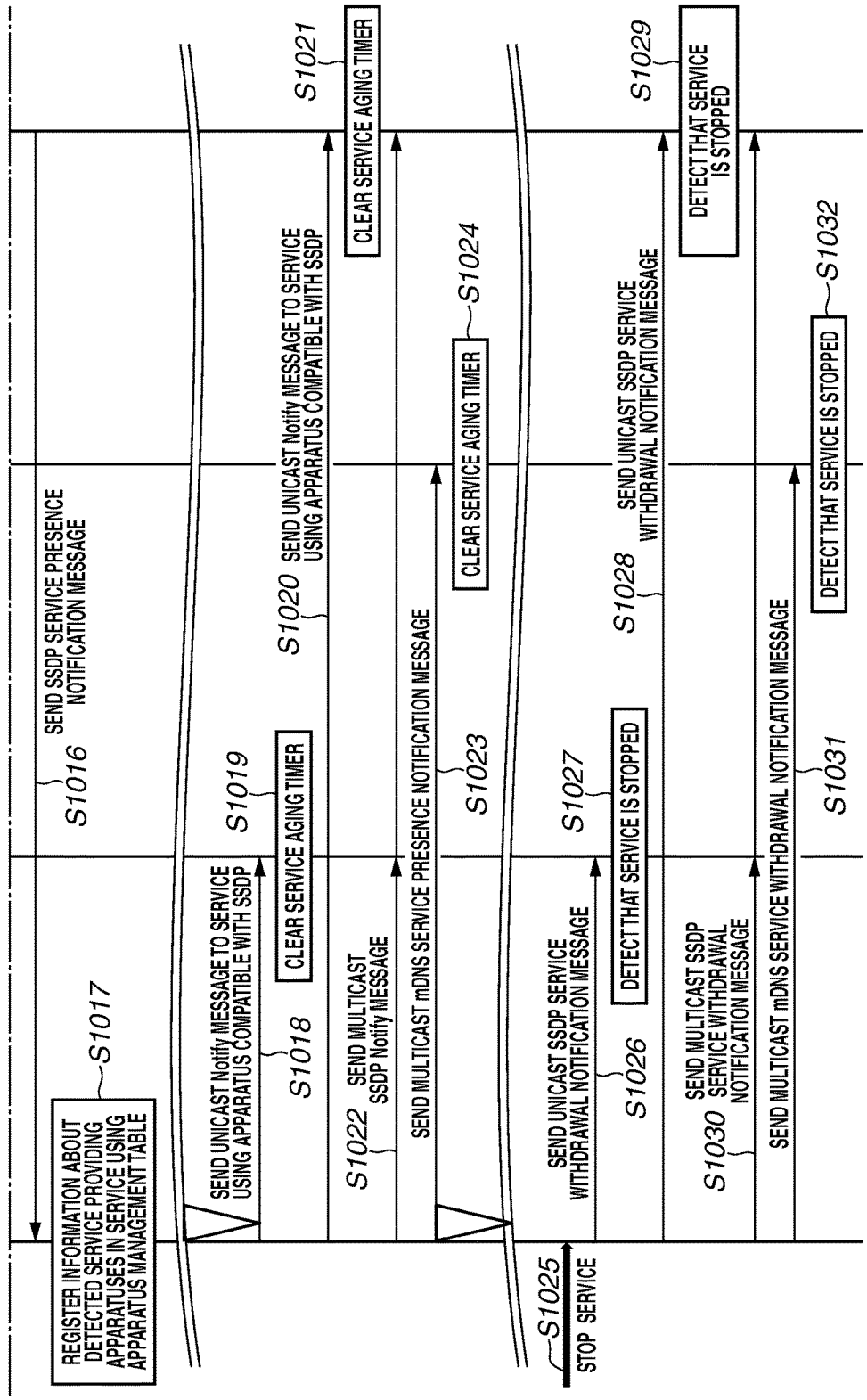
FIG. 10, divided into two parts as shown in FIG. 10A and FIG. 10B, is a sequence chart according to the second exemplary embodiment.

FIG. 9 illustrates a flow chart realized by the control unit 202 of the providing apparatus 701. The control unit 202 realizes the flow chart by reading a program stored in the storage unit 201. The flow chart is realized when the providing apparatus 701 starts providing a service. FIG. 10 illustrates a sequence chart of the case in which the providing apparatuses 701 to 704 provide and search for a service.

In the present embodiment, the providing apparatuses 701 to 704 have already joined the wireless LAN 131 configured by the AP 121. Further, each of the providing apparatuses 701 to 703 is set to receive a multicast message sent from another providing apparatus, whereas the providing apparatus 704 is set not to receive a multicast message sent from another providing apparatus.

In steps S1001 to S1004, users operate the providing apparatuses 701 to 704 to start providing and searching for a service. In step S901, when the providing apparatus 701 starts providing a service, the time measurement unit 301 starts measuring the time.

In step S902, the stop determination unit 302 determines whether the provision of the service is stopped. If the provision of the service is not stopped, then in step S903, it is determined whether the request message receiving unit 303 has received a service information search message from the using apparatus 111 or 112.

The following describes the case in which the request message receiving unit 303 has received no service information search message (NO in step S903). If the request message receiving unit 303 has received no service information search message (NO in step S903), then in step S905, the service notification unit 305 determines whether it is time to send a Notify message defined by SSDP as a service presence notification message, based on the time measured by the time measurement unit 301.

In the present embodiment, the service notification unit 305 determines that it is time to send a Notify message. If it is time to send a Notify message (YES in step S905), then in step S906, the service notification unit 305 sends a Notify message by unicast addressing to a using apparatus registered in the using apparatus management table 1101. If, however, no using apparatus is registered in the using apparatus management table 1101, the service notification unit 305 sends no unicast Notify message.

At this stage, no using apparatus is registered in the using apparatus management table 1101. Thus, the service notification unit 305 sends no unicast Notify message. In steps S907 and S1005, the service notification unit 305 sends a multicast Notify message.

In step S1006, the providing apparatus 702 having received the multicast Notify message detects that the providing apparatus 701 provides the service. On the other hand, the providing apparatus 703 does not receive the multicast Notify message, because the providing apparatus 703 is incompatible with SSDP. Further, the providing apparatus 704 also does not receive the multicast Notify message, because the providing apparatus 704 is set not to receive a multicast message. Accordingly, at this stage, the providing apparatuses 703 and 704 do not detect that the providing apparatus 701 provides the service.

Then, in step S908, the service notification unit 305 determines whether it is time to send an mDNS-compliant service presence notification message, based on the time measured by the time measurement unit 301.

In the present embodiment, the service notification unit 305 determines that it is time to send an mDNS-compliant service presence notification message. If it is time to send an mDNS-compliant service presence notification message, then in steps S909 and S1007, the service notification unit 305 sends an mDNS-compliant service presence notification message by multicast addressing.

In step S1008, the providing apparatus 703 having received the mDNS-compliant service presence notification message detects that the providing apparatus 701 provides the service. On the other hand, the providing apparatus 704 does not receive the mDNS-compliant service presence notification message, because the providing apparatus 704 is incompatible with mDNS.

Then, in step S910, the providing apparatus detection unit 802 detects another providing apparatus based on a message received from another apparatus. Specifically, if the providing apparatus detection unit 802 receives a service presence notification message, the providing apparatus detection unit 802 detects the source apparatus that has sent the service presence notification message as another providing apparatus.

At this stage, the providing apparatus detection unit 802 has received no service presence notification message from other apparatuses. Thus, the providing apparatus detection unit 802 has not detected another providing apparatus.

Then, in step S912, the providing apparatus detection unit 802 determines whether another providing apparatus stops the provision of the service, based on the message received from another apparatus. Specifically, if the providing apparatus detection unit 802 receives a service withdrawal notification message, the providing apparatus detection unit 802 determines that the source apparatus that has sent the service withdrawal notification message stops the provision of the service. If another providing apparatus stops the provision of the service (YES in step S912), then in step S913, the using apparatus management unit 801 deletes from the using apparatus management table 1101 the information about another providing apparatus that stops the provision of the service.

At this stage, the providing apparatus detection unit 802 has received no service withdrawal notification message from other apparatuses. Thus, the providing apparatus detection unit 802 has not detected that another providing apparatus stops the provision of the service.

Then, in step S1009, the providing apparatus 704 sends a service information search message by multicast addressing at predetermined timing. The request message receiving unit 303 receives the service information search message and determines that the request message receiving unit 303 receives the service information search message (YES in step S903). Then, the service notification unit 305 sends a response message in response to the received service information search message.

In steps S904 and S1010, the service notification unit 305 sends a unicast response message in response to a SSDP service information search request, or sends a multicast response message in response to a mDNS service information search request. In step S1011, the providing apparatus 704 having received the service information search response message detects that the providing apparatus 701 provides the service.

In steps S1012, S1014, and S1016, if the providing apparatuses 702 to 704 send a service presence notification message, the providing apparatus detection unit 802 receives the service presence notification messages to detect the providing apparatuses 702 to 704 (YES in step S910).

In steps S911, S1013, S1015, and S1017, the using apparatus management unit 801 registers information about the detected providing apparatuses 702 to 704 in the using apparatus management table 1101 and stores the information in the storage unit 201. The using apparatus management unit 801 registers an IP address and a source port number of each of the providing apparatuses 702 to 704 and corresponding protocol type in the using apparatus management table 1101 such that the IP address, the source port number, and the corresponding protocol type are associated with one another.

Thereafter, if it is time to send a Notify message (YES in step S905), then in step S906, the service notification unit 305 sends a Notify message by unicast addressing to the using apparatuses registered in the using apparatus management table 601. In steps S1018 and S1020, the service notification unit 305 sends a Notify message by unicast addressing to the using apparatus that is compatible with SSDP among the using apparatuses registered in the using apparatus management table 601. On the other hand, the service notification unit 305 sends no Notify message to the using apparatus that is incompatible with SSDP. This enables efficient use of the communication band.

In steps S1019 and S1021, the providing apparatuses 702 and 704 having received the unicast Notify message detect that the providing apparatus 701 continues to provide the service, and the providing apparatuses 702 and 704 clear the aging timers which are internally managed. Then, in steps S907 and S1022, the service notification unit 305 further sends a multicast Notify message.

If it is time to send an mDNS-compliant service presence notification message (YES in step S908), then in steps S909 and S1023, the service notification unit 305 sends an mDNS-compliant service presence notification message by multicast addressing.

In step S1024, the providing apparatus 703 having received the mDNS-compliant service presence notification message detects that the providing apparatus 701 continues to provide the service, and the providing apparatus 703 clears an aging apparatus which are internally managed.

Thereafter, if the user operates the providing apparatus 701 to stop the provision of the service (YES in step S902, step S1025), then in step S914, the service notification unit 305 sends an SSDP-compliant service withdrawal notification message by unicast addressing. To a using apparatus that may not receive a multicast message, the service notification unit 305 sends a service withdrawal notification message by unicast addressing.

In the present embodiment, among the using apparatuses registered in the using apparatus management table 1101, the using apparatus of which the protocol type is SSDP is determined as the using apparatus that may not receive a multicast message. Thus, in steps S1026 and S1028, the service notification unit 305 sends a service withdrawal notification message by unicast addressing to the using apparatus of which the protocol type is SSDP.

In steps S915, S916, S1030, and S1031, the service notification unit 305 further sends an SSDP-compliant service withdrawal notification message and an mNDS-compliant service withdrawal notification message by multicast addressing. In steps S1027, S1029, and S1032, the providing apparatuses 702 to 704 having received the service withdrawal notification messages detect that the providing apparatus 701 stops the provision of the service. Then, in step S917, the time measurement unit 301 stops the timer and ends the processing.

According to the present embodiment, the notification message is sent by unicast addressing only to the using apparatus that may not be able to receive a multicast packet. This enables efficient notification of the withdrawal of the service to the using apparatuses.

Figure 12:
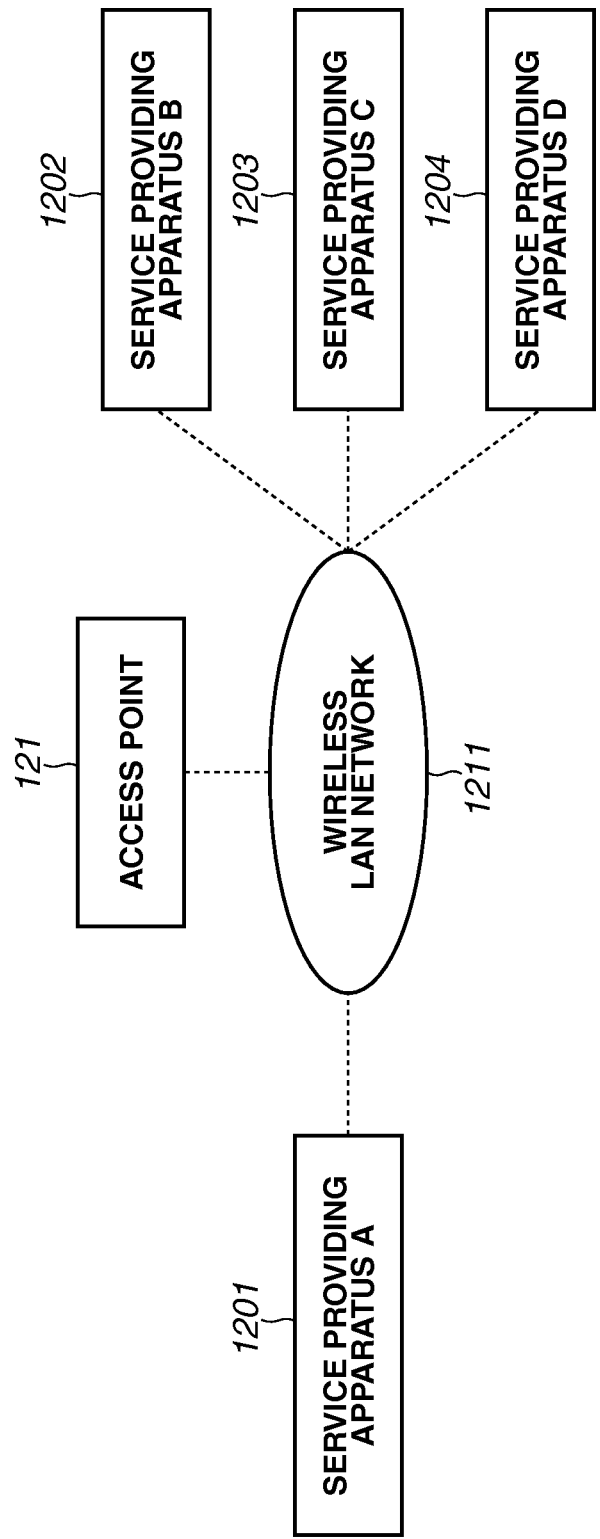
FIG. 12 illustrates the configuration of a system according to a third exemplary embodiment.

FIG. 12 illustrates the configuration of a system according to the third embodiment. The system includes four communication apparatuses (hereinafter "providing apparatuses") 1201 to 1204 each providing and using a service. Each of the providing apparatuses 1201 to 1204 selects one of the plurality of wireless LAN connection methods described below to connect to the wireless network. The hardware configurations of the providing apparatuses 1201 to 1204 are similar to that of the providing apparatus 101, therefore description of the hardware configurations is omitted in the present embodiment.

Figure 13:
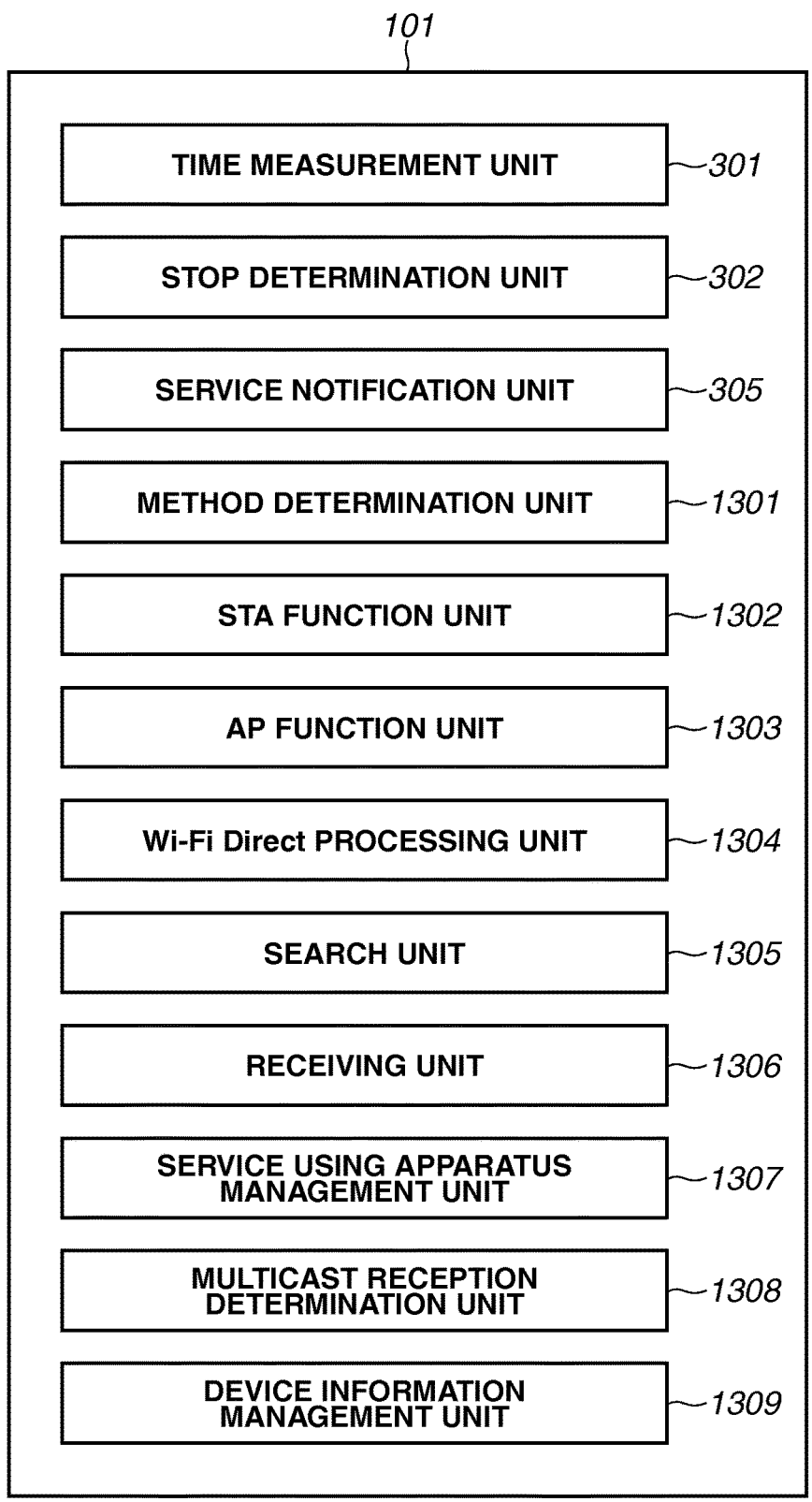
FIG. 13 is a function block diagram realized by a function providing apparatus.

FIG. 13 illustrates the function block diagram of the providing apparatus 1201. According to the present embodiment, the control unit 202 reads and executes a program stored in the storage unit 201 to realize the function blocks of the providing apparatus 1201. A part or all of the function blocks of the providing apparatus 1201 can be realized by hardware devices. The function blocks that are similar to those in the first embodiment are given the same reference numerals, and description of the function blocks is omitted in the present embodiment. The function blocks of the providing apparatuses 1202 to 1204 are also similar to those in the first embodiment, therefore description of the function blocks is omitted in the present embodiment.

A method determination unit 1301 determines the wireless LAN connection method based on the information stored in advance in the storage unit 201. A station (STA) function unit 1302 provides various functions that enable the providing apparatus 1201 to operate as an apparatus controlled by the AP 121. An AP function unit 1303 provides various functions that enable the providing apparatus 1201 to operate as an apparatus that controls the wireless network. A Wi-Fi Direct processing unit 1304 establishes a wireless LAN connection with other wireless apparatuses by use of a procedure according to the Wi-Fi Direct (trademark) standards defined by the Wi-Fi Alliance.

A search unit 1305 sends an M-SEARCH message defined by SSDP by multicast addressing. A receiving unit 1306 executes processing to receive a message sent from other providing apparatuses. A using apparatus management unit 1307 manages a unicast destination apparatus and stores the unicast destination apparatus in the storage unit 201. A multicast reception determination unit 1308 determines whether another apparatus is an apparatus that can receive a multicast. A device information management unit 1309 acquires device information about an apparatus having sent a Notify message, and stores the device information in the storage unit 201 to manage the device information.

Figure 14B:
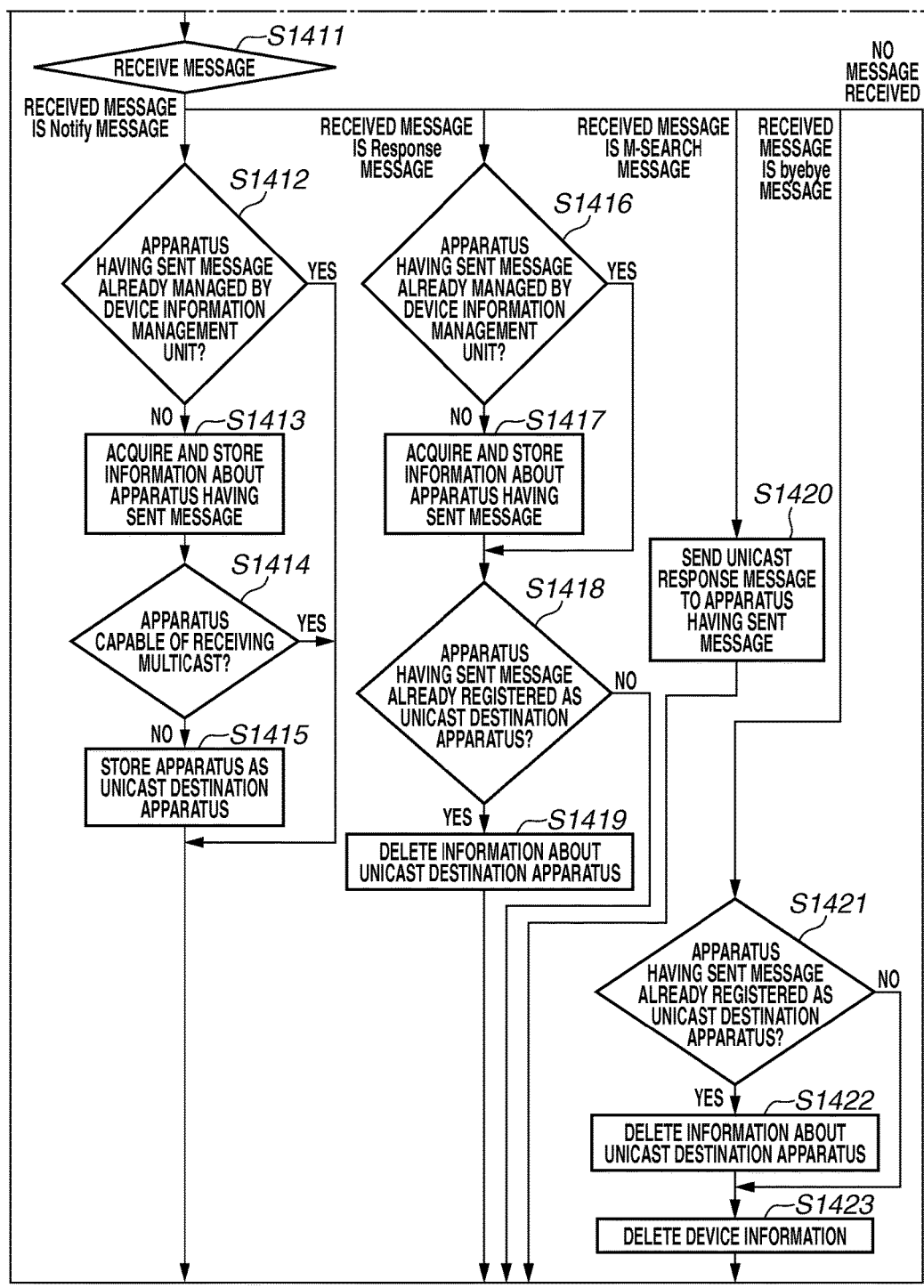
FIG. 14, divided into two parts as shown in FIG. 14A and FIG. 14B, is a flow chart realized by the function providing apparatus 101.

FIG. 14 illustrates a flow chart realized by the control unit 202 of the providing apparatus 1201. The control unit 202 realizes the flow chart by reading a program stored in the storage unit 201. The flow chart is realized if the providing apparatus 1201 starts providing a service.

In step S1401, if the providing apparatus 1201 starts providing a service, the method determination unit 1301 determines the wireless LAN connection method based on the information stored in advance in the storage unit 201.

As to the wireless LAN connection method, there are first and second methods. In the first method, the wireless LAN connection is established in the STA mode in which the providing apparatus 1201 operates as an apparatus controlled by the AP 121. In the second method, the wireless LAN connection is established in the AP mode in which the providing apparatus 1201 controls the wireless network. There is also a third method in which the wireless LAN connection is established with another wireless apparatus by use of the procedure according to the Wi-Fi Direct (trademark) standards defined by the Wi-Fi Alliance. According to Wi-Fi Direct, one apparatus and another apparatus determine which one of them operates in the STA mode or in the AP mode, and then each of the apparatuses communicates with each other according to the determined role.

In step S1402, if the method (first method) in which the providing apparatus 1201 operates in the STA mode is selected, the STA function unit 1302 connects to the AP 121. In step S1403, if the method (second method) in which the providing apparatus 1201 operates in the AP mode is selected, the AP function unit 1303 starts operating as an AP and configures a wireless network.

In step S1404, if the method (third method) in which the providing apparatus 1201 performs Wi-Fi Direct is selected, the Wi-Fi Direct processing unit 1304 performs connection processing according to the Wi-Fi Direct standard. The providing apparatus 1201 operates in the STA mode or AP mode depending on the result of the connection processing.

Once the providing apparatus 1201 successfully connects to the wireless LAN network, the providing apparatus 1201 starts providing the service and repeats steps S1406 to S1422 until the providing apparatus 1201 stops the provision of the service (until YES in step S1405). The providing apparatus 1201 stops the provision of the service when, for example, the providing apparatus 1201 leaves the wireless network in response to a user command or when the providing apparatus 1201 leaves the wireless network in view of a remaining battery level of the providing apparatus 1201.

In step S1406, if the providing apparatus 1201 does not stop the provision of the service, the time measurement unit 301 determines whether it is the timing to send a Notify message. If it is the timing to send a Notify message (YES in step S1406), then in step S1407, the service notification unit 305 sends a Notify message by multicast addressing. Further, in step S1408, the service notification unit 305 sends a Notify message by unicast addressing to a unicast destination apparatus described below.

In step S1409, the time measurement unit 301 determines whether it is the timing to send an M-SEARCH message. If it is the timing to send an M-SEARCH message (YES in step S1409), then in step S1410, the search unit 1305 sends an M-SEARCH message by multicast addressing.

In step S1411, the receiving unit 1306 performs processing to receive the message sent by other providing apparatus. In step S1412, if the received message is the Notify message, the device information management unit 1309 determines whether the apparatus that has sent the Notify message is already managed by the device information management unit 1309.

If the apparatus that has sent the Notify message is not managed (NO in step S1412), then in step S1413, the device information management unit 1309 acquires device information about the apparatus that has sent the Notify message, and the device information management unit 1309 stores the device information in the storage unit 201. As used herein, the term "device information" refers to a Device Description defined by the Universal Plug and Play (UPnP) specification. By this way, the device information management unit 1309 manages the apparatus that has sent the Notify message.

In step S1414, the multicast reception determination unit 1308 determines whether the apparatus is an apparatus that can receive a multicast, based on the acquired device information. If the multicast reception determination unit 1308 determines that the apparatus cannot receive a multicast or that it is not certain whether the providing apparatus can receive a multicast (NO in step S1414), then in step S1415, the using apparatus management unit 1307 stores the apparatus as a unicast destination apparatus.

The following describes the case in which a response message to the M-SEARCH message is received.

In step S1416, if the received message is a response message, the device information management unit 1309 determines whether the apparatus that has sent the Notify message is already managed by the device information management unit 1309. If the apparatus that has sent the Notify message is not registered (NO in step S1416), then in step S1417, the device information management unit 1309 acquires device information about the apparatus that has sent the Notify message, and the device information management unit 1309 stores the device information in the storage unit 201.

In step S1418, the using apparatus management unit 1307 determines whether the apparatus that has sent the response message is already registered as a unicast destination apparatus. If the apparatus that has sent the response message is already registered as a unicast destination apparatus (YES in step S1418), then in step S1419, the using apparatus management unit 1307 deletes the information about the apparatus. Since an apparatus that sends a response message is considered to have been able to receive an information search message sent by multicast addressing, the terminal can be eliminated from the unicast destination terminals.

The following describes the case of receiving an M-SEARCH message. If the received message is an M-SEARCH message, then in step S1420, the service notification unit 305 sends a response message by unicast addressing to the source apparatus that has sent the M-SEARCH message.

The following describes the case of receiving a byebye message. If the received message is the byebye message, then in step S1421, the using apparatus management unit 1307 determines whether the apparatus that has sent the byebye message is already registered as a unicast destination apparatus. If the apparatus is already registered as a unicast destination apparatus (YES in step S1421), then in step S1422, the using apparatus management unit 1307 deletes the information about the apparatus. Further, in step S1423, the device information management unit 1309 deletes the device information about the apparatus.

The following describes the case in which the providing apparatus 1201 stops the provision of the service. In step S1424, if the providing apparatus 1201 is to stop the provision of the service, the method determination unit 1301 determines whether the providing apparatus 1201 is connected in the STA mode.

If the providing apparatus 1201 is connected in the STA mode (YES in step S1424), then in step S1425, the service notification unit 305 sends a byebye message by unicast addressing to the apparatus registered as a unicast destination apparatus. Then, in step S1426, the service notification unit 305 sends a byebye message by multicast addressing.

In step S1427, the providing apparatus 701 disconnects from the wireless connection. If the providing apparatus 701 operates in the AP mode, the AP function is stopped at this point. Thus, the wireless LAN network communicating with other providing apparatuses is terminated.

According to the present embodiment, the unicast notification message is sent only to the using apparatus that may not be able to receive appropriately a multicast. This enables efficient notification of the termination of the service to the using apparatuses.

For example, a message can be sent to a detected providing apparatus to inquire about whether the detected providing apparatus receives a multicast packet. Then it can be determined based on a response message whether the detected providing apparatus receives a multicast packet. Alternatively, whether the detected providing apparatus receives a multicast packet can be determined based on the type of the detected providing apparatus, the version of software, etc.

While the foregoing describes examples of embodiments of the present invention, the present invention is not limited to the embodiments described or illustrated in the specification or drawings. It will of course be understood that this invention has been described above by way of example only, and that modifications of detail can be made within the scope of this invention.

Further, the method by which a providing apparatus determines whether a using apparatus can receive a multicast packet is not limited to the method described above. For example, whether a using apparatus can receive a multicast packet can be determined based on the MAC address of the using apparatus, device information about the using apparatus, version of an OS or application software, user's presetting, etc. Alternatively, an identifier of the using apparatus and the determination result can be stored in a non-volatile memory, and then whether a using apparatus can receive a multicast packet can be determined using the stored information.

Further, a unicast message can be sent to a discovered service providing apparatus to inquire whether the discovered service providing apparatus receives a multicast packet. Then, whether the discovered service providing apparatus receives a multicast packet can be determined based on a response message. For example, in the device information (Device Description) acquisition processing described above, information indicating whether the apparatus receives a multicast packet can be included in the device information of the apparatus. Whether the discovered service providing apparatus receives a multicast packet can be determined based on the device information.

Further, the method of acquiring information about the using apparatus does not have to use UPnP or mDNS as described above, and the information can be acquired using a unique communication unit. For example, information about the type of the using apparatus can be acquired by a near-field wireless communication unit that is different from the wireless LAN, and then whether the using apparatus can receive a multicast packet can be determined using the acquired information.

According to the embodiments of the present invention, a communication apparatus can notify other communication apparatuses that do not receive a multicast signal of information on a function provided by the communication apparatus when the communication apparatus sends a multicast signal to notify the information on the function provided by the communication apparatus.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2013-151649 filed Jul. 22, 2013, which is hereby incorporated by reference herein in its entirety.

What is claimed is:

1. A communication apparatus comprising:
   one or more processors; and
   a memory storing instructions which, when executed by the one or more processors, cause the communication apparatus to function as:
   a first sending unit configured to send a multicast packet containing function information;
   a second sending unit configured:
   to send a unicast packet containing the function information to another communication apparatus in a case where a request packet requesting sending of the function information has been received from the another communication apparatus after the sending of the multicast packet by the first sending unit; and
   a control unit configured to:
   control the first sending unit to send the multicast packet and also control the second sending unit to send the unicast packet to the another communication apparatus in a case where the request packet has already been received from the another communication apparatus when the multicast packet containing the function information is sent again after a predetermined time has passed since the sending of the multicast packet by the first sending unit, and
   to control the first sending unit to send the multicast packet and also control the second sending unit not to send the unicast packet to the another communication apparatus in a case where the request packet has not been received from the another communication apparatus when the multicast packet containing the function information is sent again after the predetermined time has passed since the sending of the multicast packet by the first sending unit.

2. The communication apparatus according to claim 1, wherein the instructions further cause the communication apparatus to function as:
   a determination unit configured to determine whether the communication apparatus operates as a control apparatus controlling a wireless network or operates as an apparatus controlled by the control apparatus,
   wherein based on a result of the determination made by the determination unit, the second sending unit sends the unicast packet containing the function information when the first sending unit sends the multicast packet containing the function information.

3. The communication apparatus according to claim 2, wherein if the determination unit determines that the communication apparatus operates as the controlled apparatus, the second sending unit is configured to send the unicast packet containing the function information when the first sending unit sends the multicast packet containing the function information.

4. The communication apparatus according to claim 1, wherein the request packet is an M-SEARCH defined by UPnP.

5. The communication apparatus according to claim 1, wherein the multicast packet is a Notify or byebye defined by UPnP.

6. The communication apparatus according to claim 1, wherein the first sending unit is configured to send the multicast packet in the form of a signal that is compliant with the IEEE 802.11 series.

7. A method of controlling a communication apparatus, the method comprising:
sending a multicast packet containing function information; and
sending a unicast packet containing the function information to the another communication apparatus in a case where a request packet requesting sending of the function information has been received from the another communication apparatus after the sending of the multicast packet by the first sending unit;
controlling the first sending unit to send the multicast packet and also controlling the second sending unit to send the unicast packet to the another communication apparatus in a case where the request packet has already been received from the another communication apparatus when the multicast packet containing the function information is sent again after a predetermined time has passed since the sending of the multicast packet by the first sending unit; and
controlling the first sending unit to send the multicast packet and also controlling the second sending unit not to send the unicast packet to the another communication apparatus in a case where the request packet has not been received from the another communication apparatus when the multicast packet containing the function information is sent again after the predetermined time has passed since the sending of the multicast packet by the first sending unit.

8. A non-transitory computer-readable storage medium storing a program that causes a computer to function as a communication apparatus comprising:
a first sending unit configured to send a multicast packet containing function information;
a second sending unit configured:
to send a unicast packet containing the function information to another communication apparatus in a case where a request packet requesting sending of the function information has been received from the another communication apparatus after the sending of the multicast packet by the first sending unit; and
a control unit configured to:
control the first sending unit to send the multicast packet and also control the second sending unit to send the unicast packet to the another communication apparatus in a case where the request packet has already been received from the another communication apparatus when the multicast packet containing the function information is sent again after a predetermined time has passed since the sending of the multicast packet by the first sending unit, and
to control the first sending unit to send the multicast packet and also control the second sending unit not to send the unicast packet to the another communication apparatus in a case where the request packet has not been received from the another communication apparatus when the multicast packet containing the function information is sent again after the predetermined time has passed since the sending of the multicast packet by the first sending unit.

* * * * *